(12) United States Patent
Zhang et al.

(10) Patent No.: US 9,448,316 B2
(45) Date of Patent: Sep. 20, 2016

(54) SEISMIC DATA PROCESSING INCLUDING PREDICTING MULTIPLES USING A REVERSE TIME DEMIGRATION

(71) Applicant: CGGVERITAS SERVICES SA, Massy (FR)

(72) Inventors: Yu Zhang, London (GB); Lian Duan, Crawley (GB)

(73) Assignee: CGG SERVICES SA, Massy (FR)

( * ) Notice: Subject to any disclaimer, the term of this patent is extended or adjusted under 35 U.S.C. 154(b) by 766 days.

(21) Appl. No.: 13/860,567

(22) Filed: Apr. 11, 2013

(65) Prior Publication Data

US 2013/0279292 A1 Oct. 24, 2013

Related U.S. Application Data

(60) Provisional application No. 61/635,382, filed on Apr. 19, 2012.

(51) Int. Cl.
*G01V 1/36* (2006.01)
(52) U.S. Cl.
CPC ........... *G01V 1/362* (2013.01); *G01V 2210/56* (2013.01); *G01V 2210/679* (2013.01)
(58) Field of Classification Search
CPC .. G01V 1/362; G01V 1/34; G01V 2210/675; G01V 2210/679; G01V 2210/56
USPC ....................................... 367/21, 24, 50, 73
See application file for complete search history.

(56) References Cited

U.S. PATENT DOCUMENTS

| 8,275,550 B2 * | 9/2012 | Liu | G01V 1/28 367/73 |
| 2005/0111702 A1 * | 5/2005 | Kelly | G01V 1/28 382/109 |

OTHER PUBLICATIONS

UK Search Report dated Oct. 18, 2013, in related British Application No. GB1307115.4.
Y. Zhang et al., "Predicting Multiples Using a Reverse Time Demigration", SEG Las Vegas 2012 82nd Annual Meeting, Nov. 4-9, 2012, SEG.
Edip Baysal et al., "Reverse time migration," Geophysics, vol. 48, Nov. 1983 pp. 1514-1524.
F.J. Billette et al., "The 2004 BP velocity benchmark," 67th Meeting, European Association of Geoscientists and Engineers, Expanded Abstracts., B035 Madrid, Spain Jun. 13-16, 2005.
Nerve Chauris et al., 2010, "Seismic wave-equation demigration/migration," Geophysics, vol. 75, No. 3, May-Jun. 2010, S111-S119.
Jon F. Claerbout, Toward a unified theory of reflector mapping, Geophysics, vol. 36, No. 3, Jun. 1971 pp. 467-481.

(Continued)

*Primary Examiner* — Ian J Lobo
(74) *Attorney, Agent, or Firm* — Patent Portfolio Builders PLLC

(57) ABSTRACT

Methods and systems for generating a stable reverse time demigration (RTDM) equation for predicting wave phenomena such as reflections, refractions and multiples are described. A coupling term is added to an RTDM equation and reflectivity associated with the coupling term is replaced with a pseudo-density function derived from a nonlinear equation. The resultant coupled and stabilized RTDM equation is then used to predict the desired wave phenomena based on the applied seismic image.

17 Claims, 13 Drawing Sheets

(56) References Cited

OTHER PUBLICATIONS

Tamas Nemeth et al., "Least-Squares Migration of Incomplete Reflection Data," Geophysics vol. 64, No. 1, Jan.-Feb. 1999, pp. 208-221.

A. Pica et al., "3D surface-related multiple modeling, principles and results," 75th Annual International Meeting, SEG, Houston 2005 Annual Meeting, pp. 2080-2083.

A. Pica et al., "Wave equation based internal multiple modeling in 3D," 78th Annual International Meeting, SEG, Las Vegas Annual Meeting, pp. 2476-2480.

D.J. Verschuur et al., "Estimation of multiple scattering by iterative inversion, Part II: Practical aspects and examples," Geophysics, vol. 62, No. 5, Sep.-Oct. 1997, pp. 1596-1611.

N.D. Whitmore "Iterative depth migration by backward time propagation," 53rd Annual International Meeting, SEG, Expanded Abstracts, 1983, pp. 382-385.

Mandy Wong et al., "Least-squares reverse time migration/inversion for ocean bottom data: a case study," SEG, San Antonio 2011 Annual Meeting, pp. 2369-2373.

S. Xu et al., "Full waveform inversion for reflected seismic data," W024, 74th EAGE Conference & Exhibition, Copenhagen, Denmark, Jun. 4-7, 2012.

D. Loewenthal et al., "The Wave Equation Applied to Migration", 36th Meeting of European Association of Exploration Geophysicists, Madrid, Spain, Jun. 1974, Geophysical Prospecting, vol. 24, pp. 380-399.

* cited by examiner

SEISMIC DATA PROCESSING INCLUDING PREDICTING MULTIPLES USING A REVERSE TIME DEMIGRATION

RELATED APPLICATION

The present application is related to, and claims priority from U.S. Provisional Patent Application No. 61/635,382, filed Apr. 19, 2012, entitled "Predicting Multiples Using A Reverse Time Demigration," to Yu Zhang and Lian Duan, the disclosure of which is incorporated herein by reference.

TECHNICAL FIELD

Embodiments of the subject matter disclosed herein generally relate to methods and systems for seismic data processing and, more particularly, to mechanisms and techniques for predicting multiples using a reverse time demigration.

BACKGROUND

In the context of seismic data processing, seismic migration refers to a process by which seismic events are re-located (in time or space) to the locations at which the events actually occurred rather than the location that the events were recorded at the surface, to thereby create a more accurate image of the subsurface being investigated. Demigration refers to a reverse of the migration process, which maps imaged data into modeled data for a given source/receiver configuration and given model parameters.

Demigration has developed into an important tool in for seismic imaging. Examples of demigration application include model building as described by H. Chauris and M. Benjemaa in their 2010 article entitled "Seismic Wave-Equation Demigration/Migration" published in volume 75, number 3, pages S111-S119 and incorporated herein by reference, multiple prediction as described by A. L. Pica, G. Poulain, B. David, M. Magesan, S. Baldock, T. Weisser, P Hugonnet, and P. Herrmann in their 2005 article entitled "3D Surface Related Multiple Modeling, Principles and Results" published in the 75th Annual International Meeting, SEG, Expanded abstracts, number 3, pages 2080-2083 (hereinafter "Pica") and incorporated herein by reference, seismic inversion as described by S. Xu, D. Wang, F. Chen, G. Lambaré and Y. Zhang in their article entitled "Full Waveform Inversion for Reflected Seismic Data" published in the 74th Meeting, European Association of Geoscientists and Engineers, Expanded Abstracts and incorporated herein by reference and least-squares migration as described by T. Nemeth, C. Wu, and G. T. Schuster in their 1999 article entitled "Least-Squares Migration of Incomplete Reflection Data" published in Geophysics, volume 64, pages 208-221, incorporated herein by reference.

Demigration can be differentiated from modeling based on the fact that demigration uses reflectivity to predict seismic data while modeling uses velocity and density as input models. As described by N. Bleistein, J. K. Cohen and J. W. Stockwell in their 2001 reference entitled "Mathematics of Multidimensional Seismic Inversion" published by Springer Publishing Company and incorporated herein by reference, because migration is a technical "masterpiece" for reflectivity estimation, demigration is considered as the inverse or adjoint process of migration.

The origins of demigration can be traced to the concept of an "exploding reflector" which led to one-way wave equation based post-stack migration as described by D. Lowenthal, L. Lu, K. Roberson and J. Sherwood in their 1976 article entitled "The Wave Equation Applied to Migration" published in Geophysical Prospecting, volume 24, pages 380-399 and incorporated herein by reference. Looking forward from the Lowenthal et. al. reference, many migration methods have been developed and their corresponding demigration methods followed. More recently, reverse time migration (RTM) has become a standard migration tool and is now considered indispensable for delineating subtle hydrocarbon traps beneath complex overburden. In an effort to further improve imaging quality, Least-Squares Reverse Time Migration (LSRTM) as described by M. Wong, S. Ronen and B. Biondi in their 2011 article entitled "Least-Squares Reverse Time Migration/Inversion for Ocean Bottom Data: A Case Study" published in the 81st Annual International Meeting, SEG, Expanded Abstracts, pages 2369-2373, incorporated herein by reference, is emerging and requires several iterations of RTM and Reverse Time Demigration (RTDM).

Looking to the literature, One-Way Wave Equation Demigration (OWEDM) has been used to predict and suppress both surface related multiples as described by Pica and interbed multiples as described by A. Pica and L Delmas (hereinafter "Pica and Delmas") in their 2008 article entitled "Wave Equation Based Internal Multiple Modeling in 3D" published in the 78th Annual International Meeting, SEG, Expanded Abstracts, pages 2476-2480 and incorporated herein by reference. Compared with the data driven demultiple techniques, e.g., Surface Related Multiple Elimination (SRME) as described by D. J. Verschuur and A. J. Berkhout in their 1997 article entitled "Estimation of Multiple Scattering by Iterative Inversion, Part II: Practical Aspects and Examples" published in Geophysics, Volume 62, pages 1596-1611, incorporated herein by reference, such model based multiple prediction methods are more general, better handle different acquisition geometries and are less sensitive to data sampling issues. However, when attempts are made to generalize the multiple prediction method from OWEDM to RTDM, it is found that a straightforward generalization leads to numerical instability.

Accordingly, it would be desirable to provide systems and methods that avoid the afore-described problems and drawbacks, and provide numerical computational stability when computing both surface related multiples and interbed multiples by a two-way propagation for improving the quality and capability of pre-stack depth imaging.

SUMMARY

According to an embodiment, a method, stored in a memory and executing on a processor, for generating a modeled seismic image based on a reverse time demigration (RTDM) of a seismic depth image associated with one or more seismic sources and one or more seismic receivers comprises adding a coupling term, based on a reflectivity term acting as a linear source, to an RTDM equation creating a coupled RTDM equation; estimating a pseudo-density function by converting, based on solving a nonlinear inversion, the seismic depth image to the pseudo-density function; stabilizing the coupled RTDM equation by replacing, in the coupled RTDM equation, the reflectivity term with the pseudo-density function to create a stabilized coupled RTDM equation; solving the stabilized coupled RTDM equation and reconstructing wavefields at said one or more seismic receivers based on said seismic depth image, one or more migration velocities and locations associated with said one or more seismic sources; and outputting a modeled seismic image associated with said seismic depth image.

A node for modeling seismic image data based on a reverse time demigration (RTDM) comprises a seismic depth image; one or more processors configured to execute computer instructions and a memory configured to store said computer instructions wherein said computer instructions further comprise: a coupling component for adding a coupling term to an RTDM equation, creating a coupled RTDM equation; an pseudo-density component for estimating a pseudo-density function based on said seismic depth image; a stabilizing component for replacing a reflectivity term in said coupled RTDM equation with said pseudo-density function, creating a stabilized coupled RTDM equation; an engine component for solving said stabilized coupled RTDM equation and reconstructing wavefields associated with said seismic depth image; and an output component for outputting a modeled seismic image.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. Some of the following embodiments are discussed, for simplicity, with regard to the terminology and structure of predicting multiples using a Reverse Time Demigration (RTDM). However, the embodiments to be discussed next are not limited to these configurations, but may be extended to other arrangements as discussed later.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to various embodiments described herein, methods and systems described herein use a seismic image to predict different wave phenomena, e.g., reflections, refractions and multiples. Such methods and systems can, for example, be used to predict both surface multiples and interbed multiples, which take advantage of the two-way wave equations and can be adapted to different acquisition geometries without incurring the problems and/or limitations associated with the prior attempts.

Figure 1:
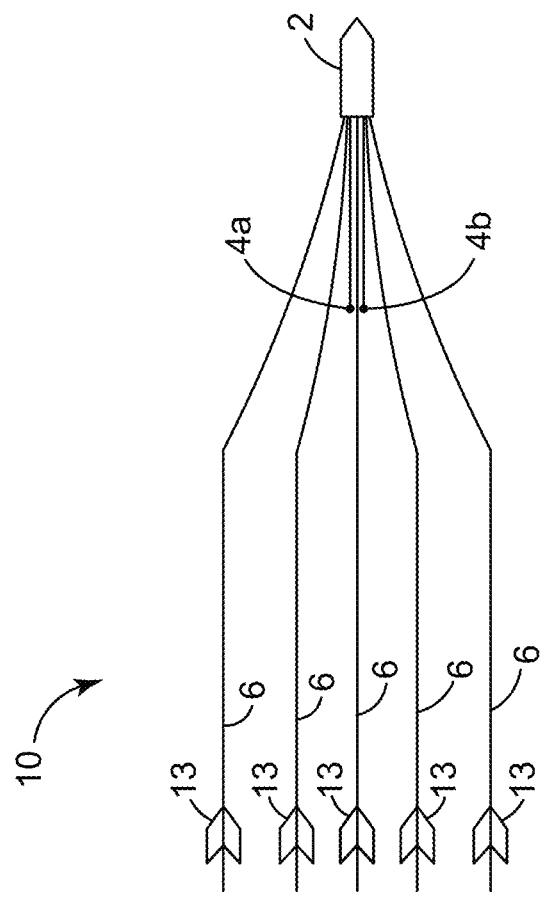
FIGS. 1 and 2 show various aspects of a marine seismic survey system in which various multiple prediction embodiments can be implemented.

In order to provide some context for the subsequent embodiments related to the collection of seismic data, the processing of the collected seismic data and the generation of seismic illumination maps, consider first a seismic data acquisition process and system as will now be described with respect to FIGS. 1 and 2. In FIG. 1, a data acquisition system 10 includes a ship 2 towing plural streamers 6 that may extend over kilometers behind ship 2. Each of the streamers 6 can include one or more birds 13 that maintains streamer 6 in a known fixed position relative to other streamers 6, and the birds 13 are capable of moving streamer 6 as desired according to bi-directional communications birds 13 can receive from ship 2.

One or more source arrays 4a,b may be also towed by ship 2 or another ship for generating seismic waves. Source arrays 4a,b can be placed either in front of or behind receivers 14, or both behind and in front of receivers 14. The seismic waves generated by source arrays 4a,b propagate downward, reflect off of, and penetrate the seafloor, wherein the refracted waves eventually are reflected by one or more reflecting structures (not shown in FIG. 1) back to the surface (see FIG. 2, discussed below). The reflected seismic waves propagate upwardly and are detected by receivers 14 provided on streamers 6. The seismic waves then reflect off of the free surface, i.e., the surface of the body of water (see FIG. 2, discussed below), traveling downward and are once again detected by receivers 14 provided on streamers 6 as receiver ghosts. This process is generally referred to as "shooting" a particular seafloor area, with the seafloor area referred to as a "cell" and the sea surface referred to as a "free surface."

Figure 2:
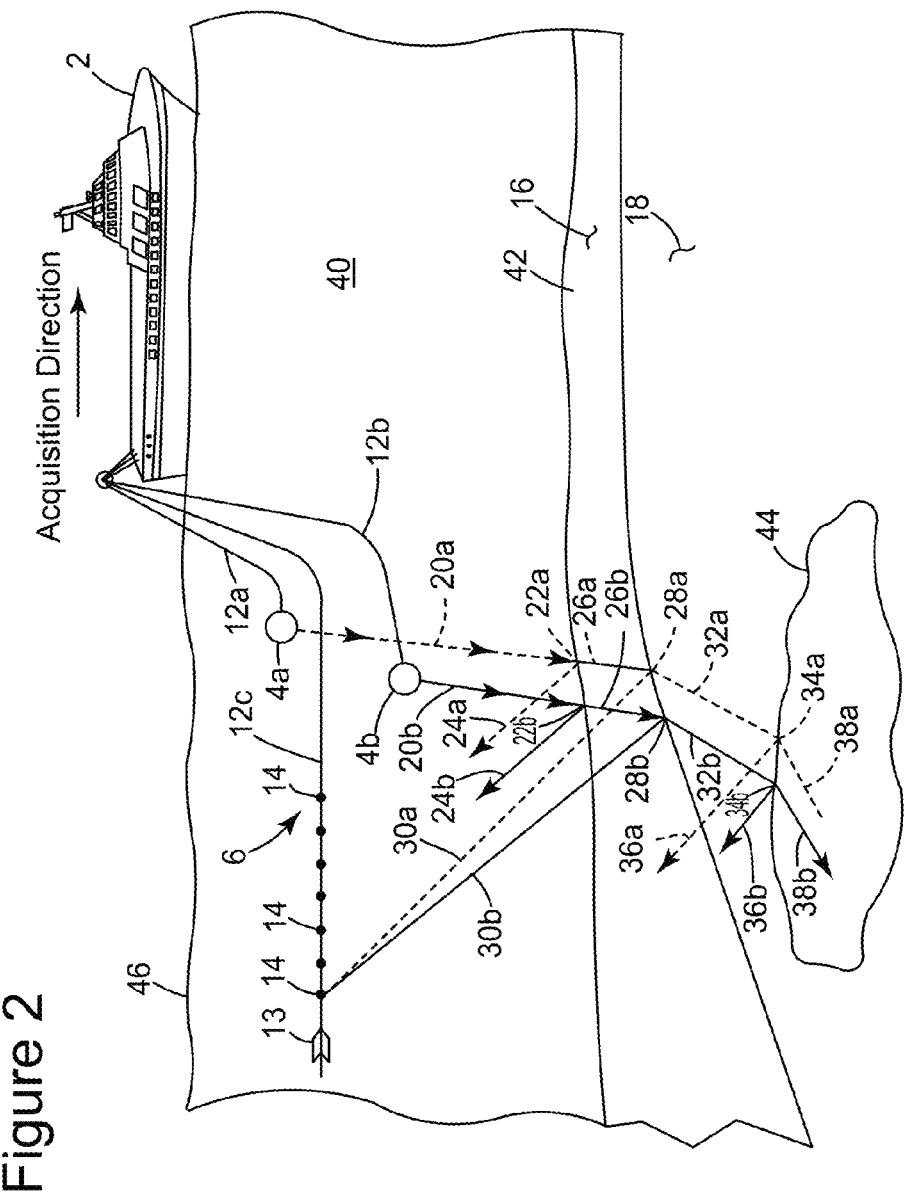

FIG. 2 illustrates a side view of the data acquisition system 10 of FIG. 1. Ship 2, located on ocean surface 46, tows one or more streamers 6, that is comprised of cables 12, and a plurality of receivers 14. Shown in FIG. 2 are two source streamers, which include sources 4a,b attached to respective cables 12a,b. Each source 4a,b is capable of transmitting a respective sound wave, or transmitted signal 20a,b. For the sake of simplifying the drawings, but while not detracting at all from an understanding of the many principles involved, only a first transmitted signal 20a will be shown (even though some or all of sources 4 can be simultaneously (or not) transmitting similar transmitted signals 20). First transmitted signal 20a travels through ocean 40 and arrives at first refraction/reflection point 22a. First reflected signal 24a from first transmitted signal 20a travels upward from ocean floor 42, back to receivers 14. As those of skill in the art can appreciate, whenever a signal—optical or acoustical—travels from one medium with a first index of refraction $n_1$ and meets with a different medium, with a second index of refraction $n_2$, a portion of the transmitted signal is reflected at an angle equal to the incident angle (according to the well-known Snell's law), and a second portion of the transmitted signal can be refracted (again according to Snell's law).

Thus, as shown in FIG. 2, first transmitted signal 20a generates first reflected signal 24a, and first refracted signal 26a. First refracted signal 26a travels through sediment layer 16 (which can be generically referred to as first subsurface layer 16) beneath ocean floor 42, and can now be considered to be a "new" transmitted signal, such that when it encounters a second medium at second refraction/reflection point 28a, a second set of refracted and reflected signals 32a and 30a, are subsequently generated. Further, as shown in FIG. 2, there happens to be a significant hydrocarbon deposit 44 within a third medium, or solid earth/rock layer 18 (which can be generically referred to as second subsurface layer 18). Consequently, refracted and reflected signals are generated by the hydrocarbon deposit, and it is the purpose of data acquisition system 10 to generate data that can be used to discover such hydrocarbon deposits 44.

The signals recorded by seismic receivers 14 vary in time, having energy peaks that may correspond to reflectors between layers. In reality, since the sea floor and the air/water are highly reflective, some of the peaks correspond to multiple reflections or spurious reflections that should be eliminated before the geophysical structure can be correctly imaged. Primary waves suffer only one reflection from an interface between layers of the subsurface (e.g., first reflected signal 24a). Waves other than primary waves are known as multiples (or ghosts). A surface multiple signal is one such example of a multiple, however there are other ways for multiples to be generated. For example, reflections form the surface can travel back down to the receivers and be recorded as ghosts. Multiples (and ghosts) do not add any useful information about the geology beneath the ocean floor, and thus they are, in essence, noise, and it is desirable to eliminate them and/or substantially reduce and/or eliminate their influence in signal processing of the other reflected signals so as to correctly ascertain the presence (or the absence) of underground/underwater hydrocarbon deposits.

The methods and systems described herein use the seismic data to predict different wave phenomena, e.g., reflections, refractions and multiples. Migrating a shot record $Q(\vec{x}_r; \vec{x}_s; t)$, with the shot at $\vec{x}_s=(x_s, y_s, z_s)$ and receivers at $\vec{x}_r=(x_r, y_r, z_r)$ involves computing the wavefields both originating at the source location and observed at the receiver locations. In an RTM, as described by D. Whitmore in his 1983 article entitled "Iterative Depth Migration by Backward Time Propogation" published in the 53rd Annual International Meeting, SEG, Expanded Abstracts, pages 382-385, incorporated herein by reference and by E. Baysal, D. D. Kosloff and J. W. C. Sherwood in their 1983 article entitled "Reverse Time Migration" published in Geophysics, volume 48, pages 1514-1524, incorporated herein by reference, the source wavefield $p_S$ expands as time increases and the recorded wavefield $p_R$, is computed backward in time by solving the acoustic wave equations:

$$\left(\frac{1}{v^2}\frac{\partial^2}{\partial t^2} - \Delta\right)p_S(\vec{x}; t; \vec{x}_s) = S(\vec{x}; t), \tag{1}$$

and $$\begin{cases}\left(\frac{1}{v^2}\frac{\partial^2}{\partial t^2} - \Delta\right)p_R(\vec{x}; t; \vec{x}_s) = 0, \\ p_R(\vec{x}_r; t; \vec{x}_s) = Q(\vec{x}_r; \vec{x}_s; t)\end{cases} \tag{2}$$

where $S(\vec{x}; t)$ is a general source and specifically, $S(\vec{x}; t)=\delta((\vec{x}-\vec{x}_s)f(t)$ for a common-shot record, $f(t)$ is the source signature, $v=v(\vec{x})$ is the velocity and $\Delta=\partial_x^2+\partial_y^2+\partial_z^2$, is the Laplacian operator.

Continuing, at a subsurface reflection point, the angle dependent reflectivity is:

$$R(\vec{x}) = \frac{p_R(\vec{x}; t; \vec{x}_s)}{p_S(\vec{x}; t; \vec{x}_s)}. \tag{3}$$

Based on relation (3), the stacked image can be expressed as:

$$I(\vec{x}) = \int\int \frac{p_R(\vec{x}; t; \vec{x}_s)}{p_S(\vec{x}; t; \vec{x}_s)}dt d\vec{x}_s. \tag{4}$$

A purpose of the Reverse Time Demigration (RTDM) technique is to reconstruct the wavefield recorded at the receivers with a given stacked image $I(\vec{x})$, migration velocity $v(\vec{x})$ and source location $\vec{x}_s$. The source wavefield $p_S$ stays the same as described in equation (1). Computing the wavefield $p_R$ on the receiver side involves substituting $I(\vec{x})$ in equation (3) for the reflectivity $R(\vec{x})$, and using the reflectivity as a secondary as a secondary source to generate $p_R$ by increasing time, leading to the equation:

$$\begin{cases}\left(\frac{1}{v^2}\frac{\partial^2}{\partial t^2} - \Delta\right)p_R(\vec{x}; t) = I(\vec{x})p_S(\vec{x}; t), \\ Q(\vec{x}_r; t) = p_R(\vec{x}_r; t).\end{cases} \tag{5}$$

Summarizing, combining equation (1) and equation (5) provides the basic formulation to RTDM, which in turn simulates only the primary reflections.

In another aspect, RTDM can be used to compute multiples. For example, introducing wavefields $p_S^1$ and $p_R^1$ defined by the equations:

$$\begin{cases} \left(\frac{1}{v^2}\frac{\partial^2}{\partial t^2} - \Delta\right)p_S^1(\vec{x};\,t) = I(\vec{x})p_R(\vec{x};\,t), \\ \left(\frac{1}{v^2}\frac{\partial^2}{\partial t^2} - \Delta\right)p_R^1(\vec{x};\,t) = I(\vec{x})p_S^1(\vec{x};\,t), \end{cases} \quad (6)$$

then the term $p_R^1(\vec{x}_r;\,t)$ provides the first order interbed multiples. See, e.g., One-way Wave Equation Demigration (OWEDM) by Pica and Delmas, which showed that the equations can be extended to generate higher order interbed multiples with an increased computational cost.

The computations can be simplified by introducing a coupling term to equation (1), i.e.:

$$\begin{cases} \left(\frac{1}{v^2}\frac{\partial^2}{\partial t^2} - \Delta\right)p_S(\vec{x};\,t) = S(\vec{x};\,t) = S(\vec{x};\,t) + I(\vec{x})p_R(\vec{x};\,t), \\ p_S(\vec{x}_r;\,t) = 0. \end{cases} \quad (7)$$

then, introducing:

$$p(\vec{x};t) = p_s(\vec{x};t) + p_R(\vec{x};t), \quad (8)$$

and summing equation (5) and equation (7), a compact formulation of RTDM for generating primary and interbed multiples is derived as:

$$\begin{cases} \left(\frac{1}{v^2}\frac{\partial^2}{\partial t^2} - \Delta\right)p(\vec{x};\,t) = S(\vec{x};\,t) + I(\vec{x})p(\vec{x};\,t), \\ Q(\vec{x}_r;\,t) = p(\vec{x}_r;\,t). \end{cases} \quad (9)$$

However, the stability of equation (9) is not guaranteed with an arbitrary reflectivity acting as a linear source term on the right hand side of equation (9).

Looking now to an embodiment, the instability of equation (9) is overcome by setting:

$$I = \sqrt{\rho}\,\nabla \cdot \frac{1}{\rho}\nabla\sqrt{\rho}, \quad (10)$$

where $\rho$ is a positive pseudo-density function. It should be noted in the embodiment that in addition to the primary and interbed multiples, surface related multiples and source-receiver ghosts can be predicting by using equation (9) together with an additional free surface condition represented by the equation:

$$\begin{cases} \left(\frac{1}{v^2}\frac{\partial^2}{\partial t^2} - \Delta\right)p(\vec{x};\,t) = S(\vec{x};\,t) + I(\vec{x})p(\vec{x};\,t), \\ p(\vec{x};\,t)|_{z=0} = 0, \\ Q(\vec{x}_r;\,t) = p(\vec{x}_r;\,t). \end{cases} \quad (11)$$

Equation (9) and equation (11) can then be applied to any acquisition geometries for multiple prediction and ghost prediction.

In light of the previously described material, an embodiment of a stable RTDM technique comprises first, estimating a pseudo-density function $\rho$ from the associated stacked image $I(\vec{x})$ by solving the least-square optimization problem:

$$C(\rho) = \left\| I - \sqrt{\rho}\,\nabla \cdot \frac{1}{\rho}\nabla\sqrt{\rho} \right\|^2 = \min. \quad (12)$$

Next in the embodiment, solving either equation (9) or equation (11) to compute the seismic record $Q(\vec{x}_r;\,t)$ wherein I is replaced by $$\sqrt{\rho}\,\nabla \cdot \frac{1}{\rho}\nabla\sqrt{\rho}$$

to make the solution stable. It should be noted in the embodiment that the least-square optimization problem (12) is nonlinear and a solution comprises introducing:

$$\alpha^4 = \rho, \quad (13)$$

$$\vec{F} = \frac{1}{\beta}\nabla\beta,$$

and reformulating the least-square optimization problem (12) as:

$$C(\rho,\alpha,\vec{F}) = \min, \quad (14)$$

where:

$$C = \left\| I + |\vec{F}|^2 - \nabla \cdot \vec{F} \right\|^2 + \left\| \vec{F} - \frac{\nabla\alpha^2}{\alpha^2} \right\|^2 + \varepsilon\|\vec{F}\|^2. \quad (15)$$

It should be noted in the embodiment that the $\epsilon$ in equation (15) is a positive real penalization parameter for the total energy variation of F and is used to regularize the optimization estimates. Further, it should be noted in the embodiment that the total least-square problem (14) can be solved by a method such as, but not limited to, a steepest descent method.

Figure 3:
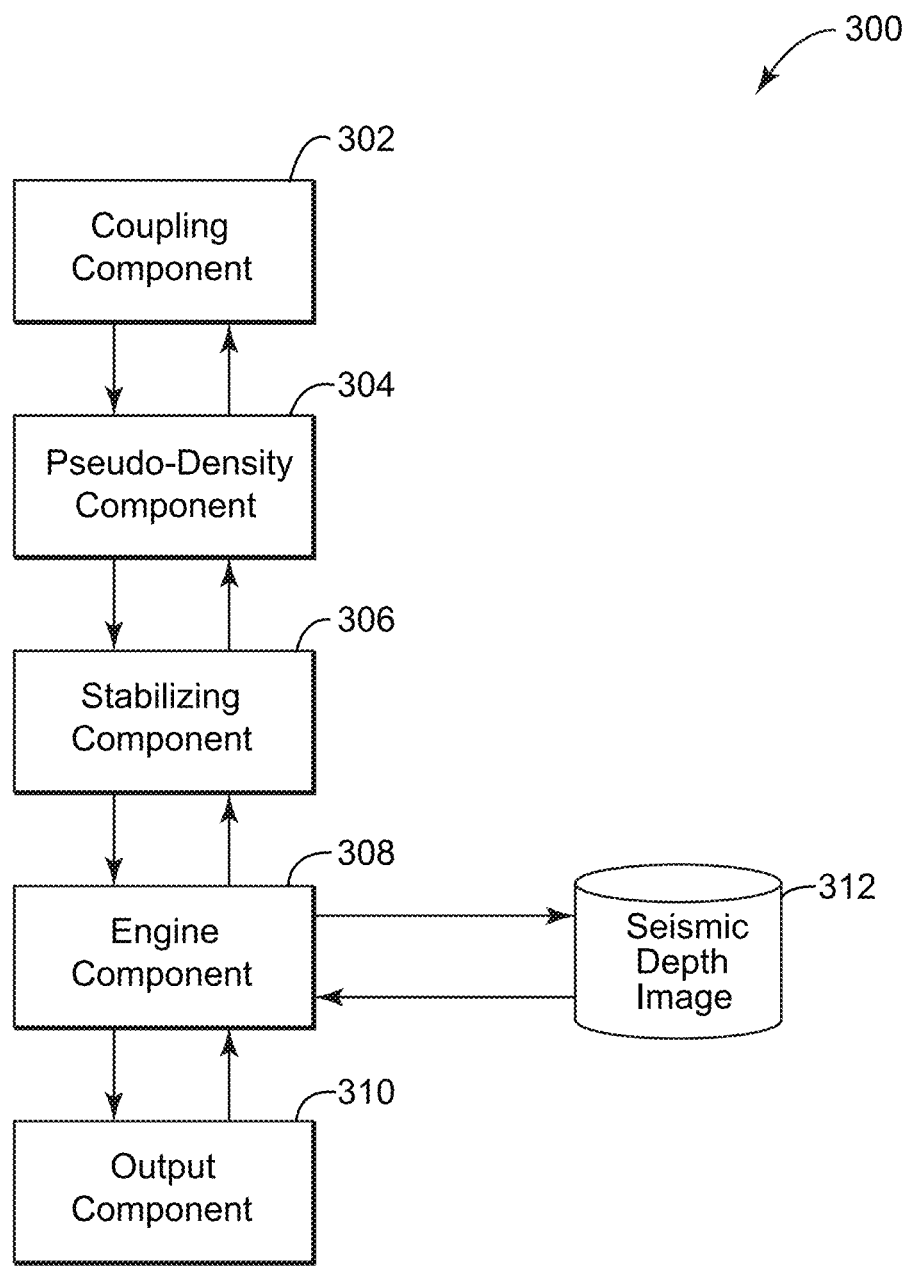
FIG. 3 is a schematic diagram showing a node for generating a modeled seismic image comprising a coupling component, a pseudo-density component, a stabilizing component, an engine component, an output component and a seismic depth image.

Looking now to FIG. 3, a schematic diagram of a node 300 for predicting multiples and ghosts based on a reverse time demigration is depicted. The node 300 comprises a coupling component 302, a pseudo-density component 304, a stabilizing component 306, an engine component 308, an output component 310 and a seismic depth image dataset 312. Continuing with the embodiment, the coupling component 302 provides the ability to add a coupling term to a RTDM equation. It should be noted in the embodiment that the coupling term relates the wavefields at the source side to the wavefield at the receiver side. Further in the embodiment, it should be noted that the adding a coupling term to the RTDM equation introduces instability to the RTDM equation for an arbitrary reflectivity acting as a linear source term in the coupled RTDM equation.

Next in the embodiment, the pseudo-density component 304 provides the ability to estimate a pseudo-density function based on a given stack image. Further in the embodiment, it should be noted that the pseudo-density function is a nonlinear function. Continuing with the embodiment of the node 300, the stabilizing component 306 provides the capability to replace a reflectivity term in the coupled RTDM equation with pseudo-density function generated by the pseudo-density component 304.

Further in the embodiment of the node 300, the engine component 308 provides the ability to solve the stabilized coupled RTDM equation in light of the selected seismic depth image dataset 312. It should be noted in the embodiment node 300 that wavefields are reconstructed at the seismic receivers for one or more migration velocities and locations associated with one or more seismic sources. Next in the embodiment node 300, the output component 310 provides the capability to output modeled seismic images for analysis related to resource exploration. It should be noted in the embodiment that the modeled seismic images output can vary based on the stabilized coupled RTDM equation solved and the seismic depth image dataset 312.

Figure 4:
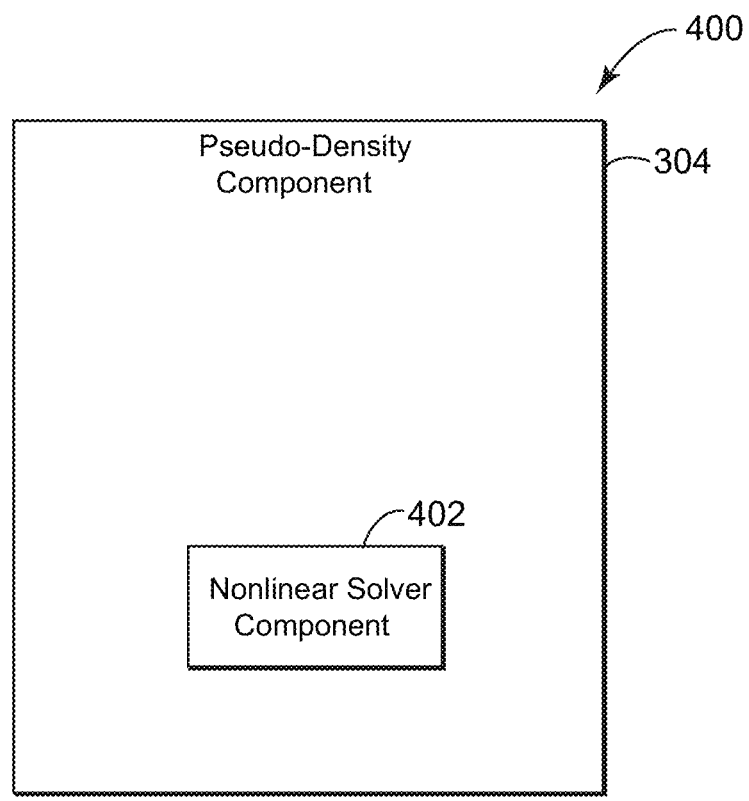
FIG. 4 is a schematic diagram showing a pseudo-density component of a node for generating a modeled seismic image, further comprising a nonlinear solver component.

Next in the embodiment, referring to FIG. 4, a schematic diagram 400 of a pseudo-density component 304 of a node 300 is depicted. The pseudo-density component 304 further comprises a nonlinear solver component 402 for optimizing the nonlinear pseudo-density function. It should be noted in the embodiment that the nonlinear solver component can reformat the pseudo-density function, as previously described, to provide a pseudo-density function of simpler optimization.

Figure 5:
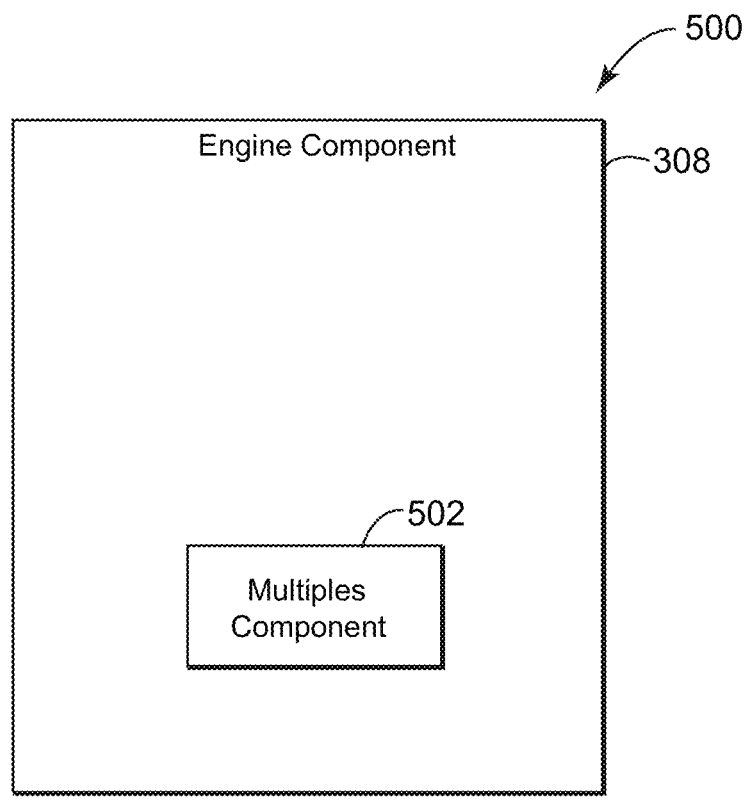
FIG. 5 is a schematic diagram showing an engine component of a node for generating a modeled seismic image, further comprising a multiples component.

Looking now to FIG. 5, a schematic diagram 500 of an engine component 308 of a node 300 is depicted. The engine component 308 further comprises a multiples component 502 for generating multiples associated with the seismic depth image 312 based on solving the stabilized coupled RTDM equation. It should be noted in the embodiment, that the multiples generated by the multiples component 502 can be surface related multiples and/or interbed multiples.

Figure 6:
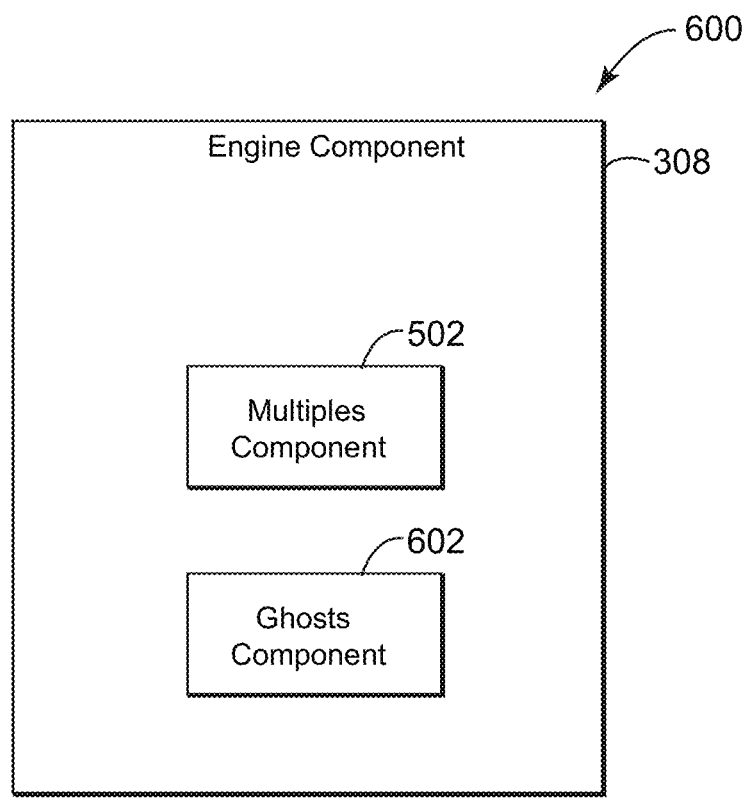
FIG. 6 is a schematic diagram showing an engine component of a node for generating a modeled seismic image, comprising a multiples component, and further comprising a ghosts component.

Continuing with the embodiment, in FIG. 6, a schematic diagram 600 of an engine component 308 of a node 300 is depicted. The engine component 308 further comprises a multiples component 502 as previously described and a ghosts component 602 for generating ghosts associated with the seismic depth image 312 based on solving the stabilized coupled RTDM equation. It should be noted in the embodiment, that the ghosts generated by the ghosts component 602 can be source ghosts and/or receiver ghosts.

Figure 7:
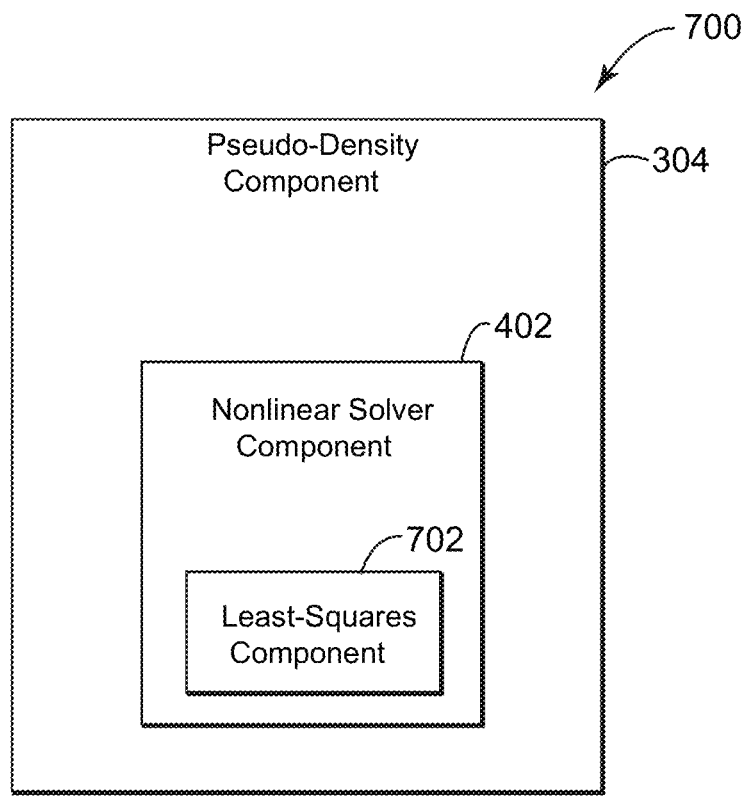
FIG. 7 is a schematic diagram showing a pseudo-density component of a node for generating a modeled seismic image, comprising a nonlinear solver component further comprising a least-squares component.

Looking now to FIG. 7, a schematic diagram 700 of a pseudo-density component 304 of a node 300 is depicted. The pseudo-density component 304 provides the capabilities as previously described and further comprises a nonlinear solver component 402. The nonlinear solver component 402 provides the capabilities as previously described and further comprises a least-squares component 702 for optimizing the pseudo-density function with a least-squares technique. It should be noted in the embodiment that a least-squares technique is a steepest descent technique.

Figure 8:
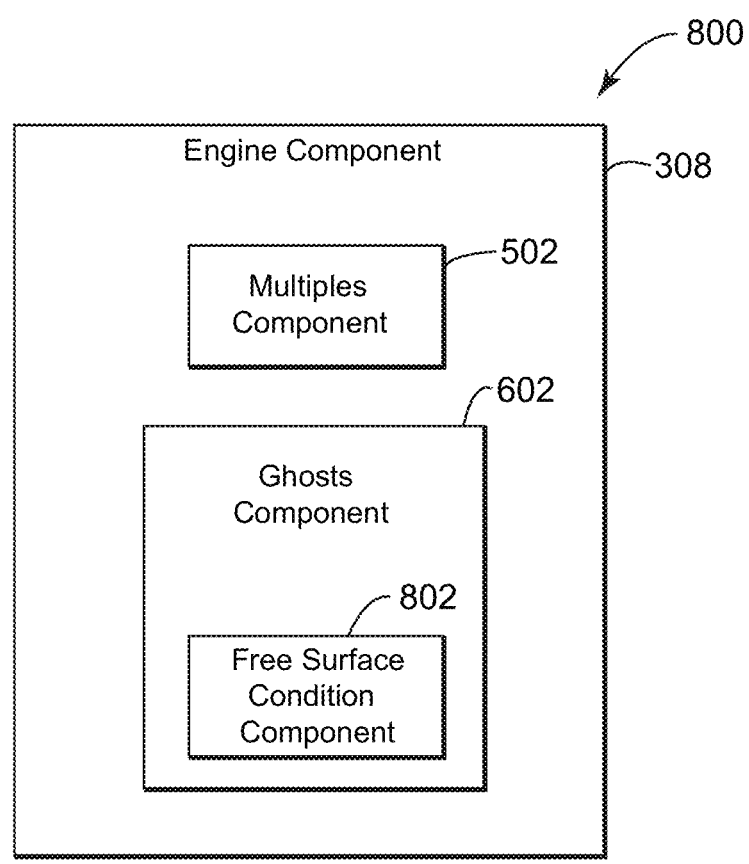
FIG. 8 is a schematic diagram showing an engine component of a node for generating a modeled seismic image, comprising a multiples component, and a ghosts component further comprising a free surface condition component.

Next in the embodiment, referring to FIG. 8, a schematic diagram 800 of an engine component 308 of a node 300 is depicted. The engine component 308 provides the capabilities as previously described and further comprises a multiples component 502 and a ghosts component 602. The multiples component 502 and the ghosts component 602 provides the capabilities as previously described and the ghosts component 602 further comprises a free surface condition component 802 for configuring the stabilized coupled RTDM equation to generate source and receiver ghosts. It should be noted in the embodiment that an additional condition can be added to the stabilized coupled RTDM equation wherein the wavefield at the surface can be set to zero.

Figure 9:
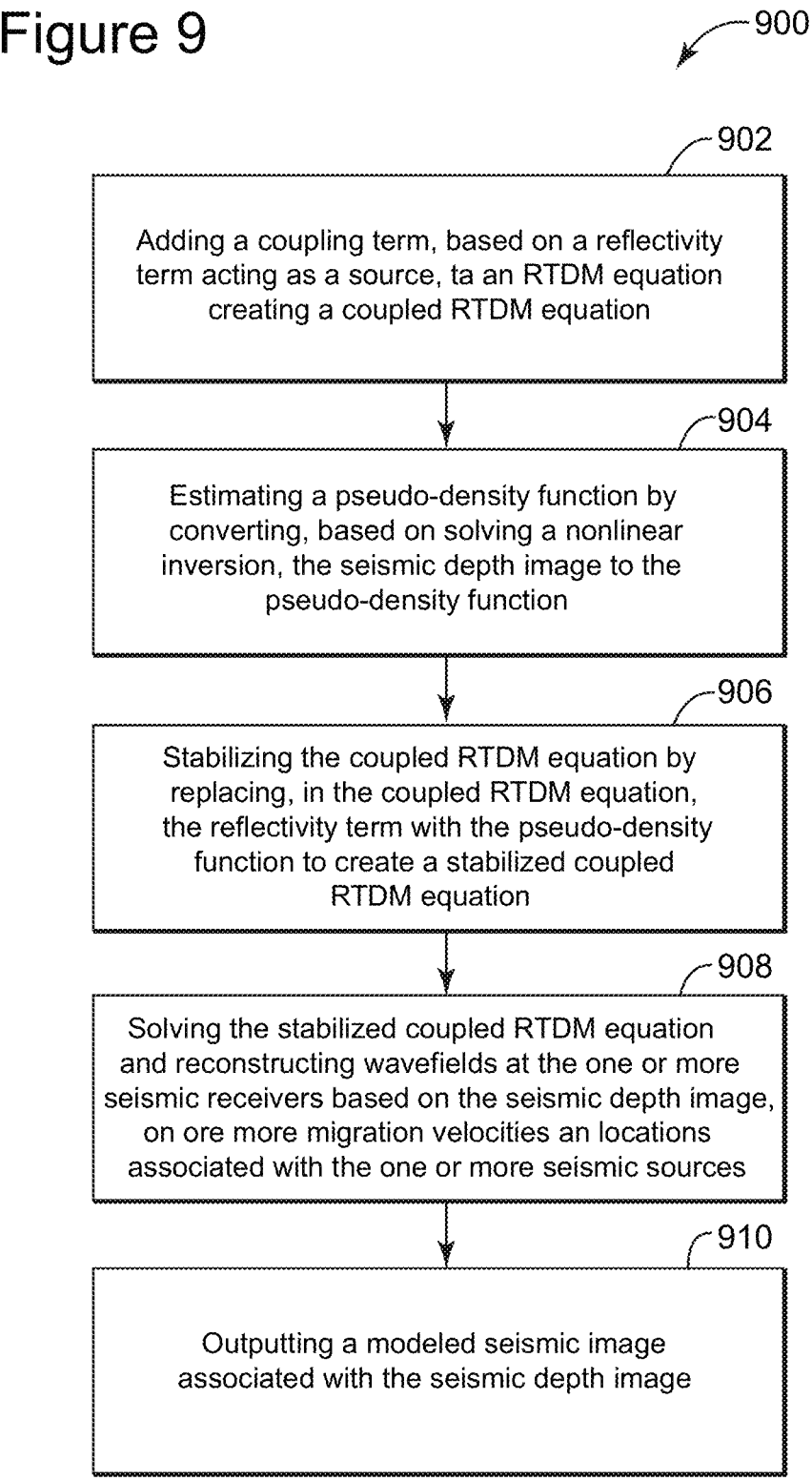
FIG. 9 is a flowchart illustrating a detailed method for generating a modeled seismic image based on an stabilized coupled RTDM of a seismic depth image.

Looking now to FIG. 9, a method embodiment 900 of generating a modeled seismic image based on a RTDM of a seismic depth image is depicted. Starting at step 902, the method embodiment 900 adds a coupling term to an RTDM equation. In another aspect of the method embodiment 900 step 902, the coupling term is based on a reflectivity term wherein the reflectivity term is acting as a source. Further, step 902 of the method embodiment 900 transforms the RTDM equation to a coupled RTDM equation.

Next, at step 904, the method embodiment 900 estimates a pseudo-density function. In another aspect of step 904 of the method embodiment 900, the pseudo-density function is estimated by converting a seismic depth image to a pseudo-density function. It should be noted in the method embodiment 900 step 904 that the conversion is based on solving a nonlinear inversion. Continuing at step 906, the method embodiment 900 stabilizes the coupled RTDM equation. In another aspect of step 906 of the method embodiment 900, the stabilization is accomplished by the reflectivity term in the coupled RTDM equation with the pseudo-density function. It should be noted in the method embodiment 900 step 906 that a stabilized coupled RTDM equation is generated.

Next at step 908 of the method embodiment 900, the stabilized coupled RTDM equation is solved. In another aspect of step 908 of the method embodiment 900, the wavefields are reconstructed at one or more seismic receivers, based on the seismic depth image, one or more migration velocities and locations associated with the one or more seismic sources. Continuing at step 910 of the method embodiment 900, the modeled seismic image associated with the seismic depth image is output. It should be noted in the method embodiment 900 at step 910, that the modeled seismic image can be, but not limited to surface related multiples, interbed multiples, source ghosts and receiver ghosts.

Figure 10:
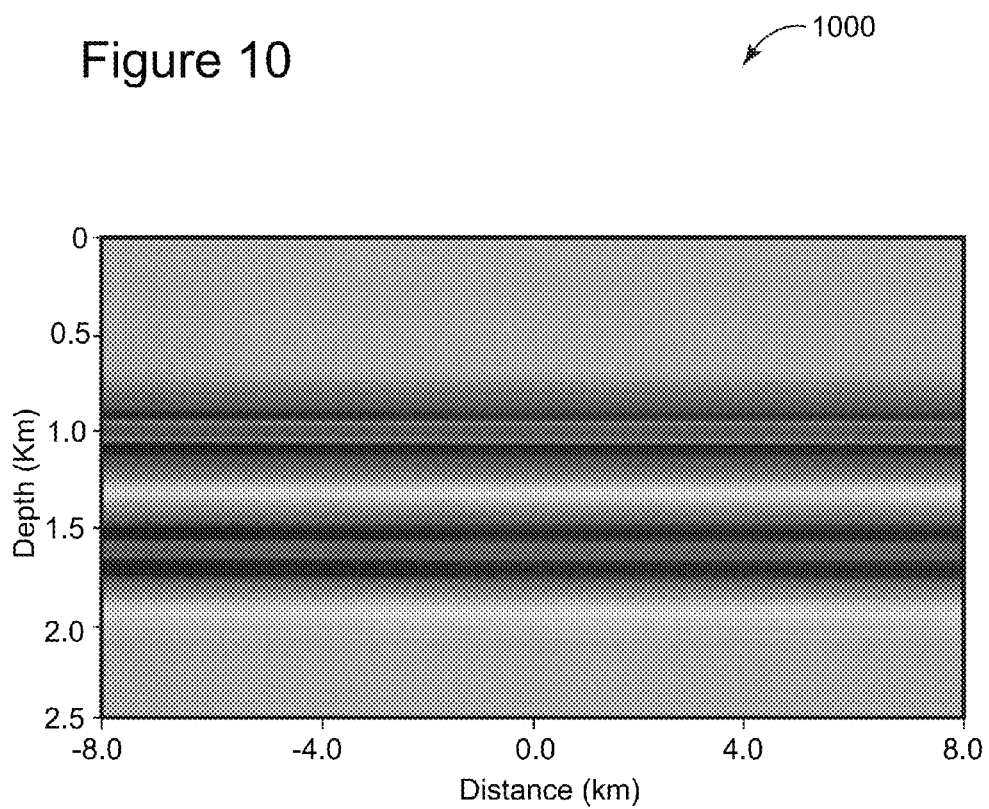
FIG. 10 is a schematic diagram showing a two-layer horizontal reflector model.
Figure 11:
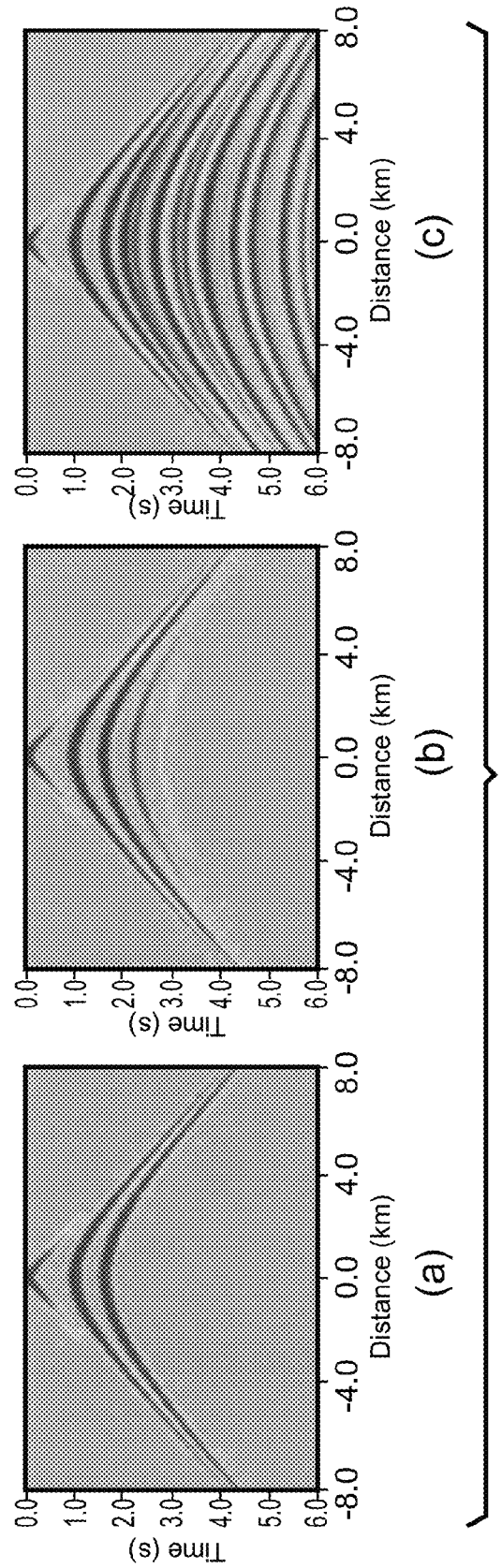
FIG. 11 is a graphical representation of multiples from RTDM wherein 11a is primary multiples only, 11b is primary multiples plus interbed multiples and 11c is primary multiples plus interbed multiples and surface related multiples.

The following example is designed to illustrated benefits of the RTDM embodiments described above. The stacked image provided in this example only has two horizontal layers, with the depth at 1.0 kilometers and 1.6 kilometers respectively, as shown in FIG. 10. In the RTDM, the shot is put at the center of the section and all the receivers spread out to an offset of 8000 meters on either side. We use a constant velocity model, i.e., both the shot and the receivers are put at 10 meter depth. Therefore, the ghosts caused by the free surface are recorded in the data. FIG. 11 shows three demigration results, i.e., 1) the primary multiple only data (FIG. 11*a*) calculated by equations (1) and (5); 2) The primary plus interbed multiples (FIG. 11*b*) calculated by equation (9); and 3) the primary plus interbed multiples and surface related multiples (FIG. 11*c*) calculated by equation (11).

Figure 12:
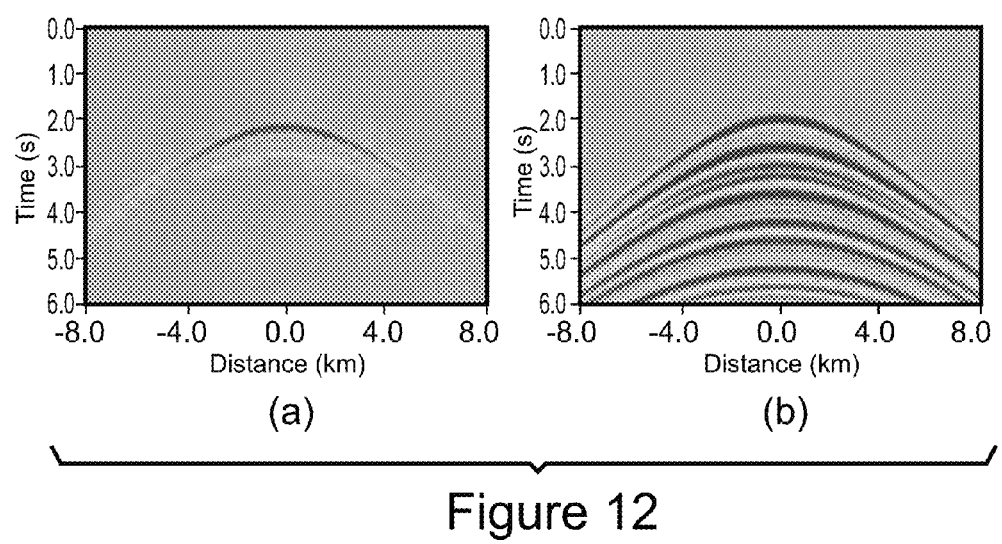
FIG. 12 is graphical representation of predicted multiples wherein 12a is predicted interbed multiples and 12b is predicted surface related multiples.

Based on the simplicity of the reflectivity model presented in FIG. 10, it can be verified that both primary and multiples are correctly predicted by the previously presented method. The generated datasets can be used to predict multiples. The predicted interbed multiples, FIG. 12*a*, can be obtained by applying an adaptive subtraction to the two datasets shown in FIGS. 11*b* and 11*c*. A direct subtraction of FIGS. 11*c* and 11*b* gives all the surface related multiples, as shown in FIG. 12*b*. It should be noted in the embodiment that FIG. 12*a* represents the predicted interbed multiples.

Figure 13:
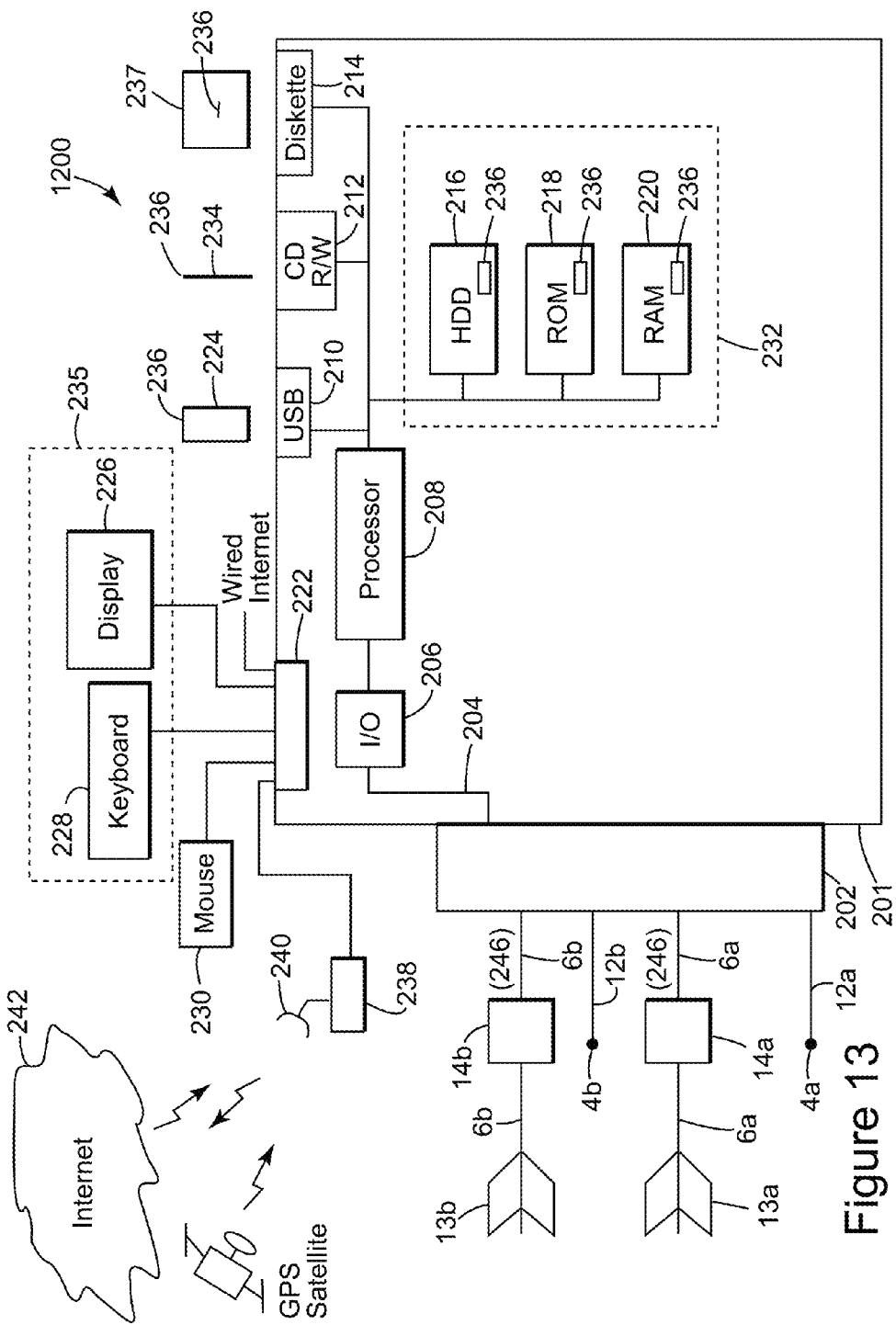
FIG. 13 illustrates a data processing device or system which can be used to implement the embodiments.

The computing device(s) or other network nodes involved in multiple prediction using RTDM as set forth in the above described embodiments may be any type of computing device capable of processing and communicating seismic data associated with a seismic survey. An example of a representative computing system capable of carrying out operations in accordance with these embodiments is illustrated in FIG. 13. System 1200 includes, among other items, server 201, source/receiver interface 1202, internal data/communications bus (bus) 204, processor(s) 208 (those of ordinary skill in the art can appreciate that in modern server systems, parallel processing is becoming increasingly prevalent, and whereas a single processor would have been used in the past to implement many or at least several functions, it is more common currently to have a single dedicated processor for certain functions (e.g., digital signal processors) and therefore could be several processors, acting in serial and/or parallel, as required by the specific application), universal serial bus (USB) port 210, compact disk (CD)/digital video disk (DVD) read/write (R/W) drive 212, floppy diskette drive 214 (though less used currently, many servers still include this device), and data storage unit 232.

Data storage unit 232 itself can comprise hard disk drive (HDD) 216 (these can include conventional magnetic storage media, but, as is becoming increasingly more prevalent, can include flash drive-type mass storage devices 224, among other types), ROM device(s) 218 (these can include electrically erasable (EE) programmable ROM (EEPROM) devices, ultra-violet erasable PROM devices (UVPROMs), among other types), and random access memory (RAM) devices 220. Usable with USB port 210 is flash drive device 224, and usable with CD/DVD R/W device 212 are CD/DVD disks 234 (which can be both read and write-able). Usable with diskette drive device 214 are floppy diskettes 237. Each of the memory storage devices, or the memory storage media (216, 218, 220, 224, 234, and 237, among other types), can contain parts or components, or in its entirety, executable software programming code (software) 236 that can implement part or all of the portions of the method described herein. Further, processor 208 itself can contain one or different types of memory storage devices (most probably, but not in a limiting manner, RAM memory storage media 220) that can store all or some of the components of software 236.

In addition to the above described components, system 200 also comprises user console 234, which can include keyboard 228, display 226, and mouse 230. All of these components are known to those of ordinary skill in the art, and this description includes all known and future variants of these types of devices. Display 226 can be any type of known display or presentation screen, such as liquid crystal displays (LCDs), light emitting diode displays (LEDs), plasma displays, cathode ray tubes (CRTs), among others. User console 235 can include one or more user interface mechanisms such as a mouse, keyboard, microphone, touch pad, touch screen, voice-recognition system, among other inter-active inter-communicative devices.

User console 234, and its components if separately provided, interface with server 201 via server input/output (I/O) interface 222, which can be an RS232, Ethernet, USB or other type of communications port, or can include all or some of these, and further includes any other type of communications means, presently known or further developed. System 200 can further include communications satellite/global positioning system (GPS) transceiver device 238, to which is electrically connected at least one antenna 240 (according to an embodiment, there would be at least one GPS receive-only antenna, and at least one separate satellite bi-directional communications antenna). System 200 can access internet 242, either through a hard wired connection, via I/O interface 222 directly, or wirelessly via antenna 240, and transceiver 238.

Server 201 can be coupled to other computing devices, such as those that operate or control the equipment of ship 2, via one or more networks. Server 201 may be part of a larger network configuration as in a global area network (GAN) (e.g., internet 242), which ultimately allows connection to various landlines.

According to a further embodiment, system 200, being designed for use in seismic exploration, will interface with one or more sources 4*a,b* and one or more receivers 14. These, as previously described, are attached to streamers 6*a,b*, to which are also attached birds 13*a,b* that are useful to maintain positioning. As further previously discussed, sources 4 and receivers 14 can communicate with server 201 either through an electrical cable that is part of streamer 6, or via a wireless system that can communicate via antenna 240 and transceiver 238 (collectively described as communications conduit 246).

According to further embodiments, user console 235 provides a means for personnel to enter commands and configuration into system 200 (e.g., via a keyboard, buttons, switches, touch screen and/or joy stick). Display device 226 can be used to show: streamer 6 position; visual representations of acquired data; source 4 and receiver 14 status information; survey information; and other information important to the seismic data acquisition process. Source and receiver interface unit 202 can receive the hydrophone seismic data from receiver 14 though streamer communication conduit 248 (discussed above) that can be part of streamer 6, as well as streamer 6 position information from birds 13; the link is bi-directional so that commands can also be sent to birds 13 to maintain proper streamer positioning. Source and receiver interface unit 202 can also communicate bi-directionally with sources 4 through the streamer communication conduit 248 that can be part of streamer 6. Excitation signals, control signals, output signals and status information related to source 4 can be exchanged by streamer communication conduit 248 between system 200 and source 4.

Bus 204 allows a data pathway for items such as: the transfer and storage of data that originate from either the source sensors or streamer receivers; for processor 208 to access stored data contained in data storage unit memory 232; for processor 208 to send information for visual display to display 226; or for the user to send commands to system operating programs/software 236 that might reside in either the processor 208 or the source and receiver interface unit 202.

System 200 can be used to implement the methods described above associated with multiple prediction using RTDM according to an embodiment. Hardware, firmware, software or a combination thereof may be used to perform the various steps and operations described herein. According to an embodiment, software 236 for carrying out the above discussed steps can be stored and distributed on multi-media storage devices such as devices 216, 218, 220, 224, 234, and/or 237 (described above) or other form of media capable of portably storing information (e.g., universal serial bus (USB) flash drive 426). These storage media may be inserted into, and read by, devices such as the CD-ROM drive 414, the disk drive 412, among other types of software storage devices.

The disclosed embodiments provide a server node, and a method for multiple prediction/removal using RTDM associated with seismic data. It should be understood that this description is not intended to limit the invention. On the contrary, the embodiments are intended to cover alternatives, modifications and equivalents, which are included in the spirit and scope of the invention. Further, in the detailed description of the embodiments, numerous specific details are set forth in order to provide a comprehensive understanding of the invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a general purpose computer or a processor.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method, stored in a memory and executed on a processor, for generating a modeled seismic image based on a reverse time demigration (RTDM) of a seismic depth image of a subsurface formation, said method comprising:
   acquiring data that form the seismic depth image, with one or more seismic receivers, upon firing one or more seismic sources;
   adding a coupling term, based on a reflectivity term acting as a linear source, to the RTDM equation for the seismic depth image to create a coupled RTDM equation;
   estimating a pseudo-density function by converting, based on solving a nonlinear inversion, said seismic depth image to said pseudo-density function;
   stabilizing said coupled RTDM equation by replacing, in said coupled RTDM equation, said reflectivity term with said pseudo-density function to create a stabilized coupled RTDM equation;
   solving said stabilized coupled RTDM equation and reconstructing wavefields at said one or more seismic receivers based on said seismic depth image, one or more migration velocities and locations associated with said one or more seismic sources; and
   outputting a modeled seismic image of said subsurface formation and associated with said seismic depth image, wherein said modeled seismic image comprises surface related multiples or interbed multiples.

2. The method of claim 1, wherein said coupling term is the product of the stacked image at a predefined location and a wavefield at said predefined location and a predefined time.

3. The method of claim 1, further comprising adding an additional free surface condition of the wavefield at the surface is equal to zero and wherein said modeled seismic image comprises source-receiver ghosts.

4. The method of claim 1, wherein said solving a nonlinear inversion comprises applying a least-square optimization.

5. The method of claim 4, wherein said least-square optimization is applied to an optimization equation $$C(\rho) = \left\| I - \sqrt{\rho}\, \nabla \cdot \frac{1}{\rho} \nabla \sqrt{\rho} \right\|^2 = \min$$

where $\rho$ is a positive pseudo-density function, I is the stacked image and $\nabla$ is the spatial vector differential operator.

6. The method of claim 5, wherein said optimization equation is reformulated as $C(\rho, \alpha, \vec{F}) = \min$, where $$C = \left\| I + |\vec{F}|^2 - \nabla \cdot \vec{F} \right\|^2 + \left\| \vec{F} - \frac{\nabla \alpha^2}{\alpha^2} \right\|^2 + \varepsilon \|\vec{F}\|^2,$$

$\vec{F}$ is $$\frac{1}{\beta} \nabla \beta,$$

$\alpha$ is $\sqrt{\beta}$, $\beta$ is $\sqrt{\rho}$, and $\varepsilon$ is a positive real penalization parameter for the total energy variation of $\vec{F}$.

7. The method of claim 6, wherein said optimization equation is solved by a steepest descent method.

8. The method of claim 1, wherein said pseudo-density function is related to a stacked image by the equation $$I = \sqrt{\rho}\, \nabla \cdot \frac{1}{\rho} \nabla \sqrt{\rho},$$

where I is said stacked image, $\rho$ is said pseudo-density function and $\nabla$ is the spatial vector differential operator.

9. A node for modeling seismic image data based on a reverse time demigration (RTDM), said node comprising:
   an interface for acquiring data that form a seismic depth image representing a subsurface formation, with one or more seismic receivers, after firing one or more seismic sources;
   one or more processors configured to execute computer instructions and a memory configured to store said computer instructions wherein said computer instructions further comprise:
      a coupling component for adding a coupling term to an RTDM equation, creating a coupled RTDM equation;
      a pseudo-density component for estimating a pseudo-density function based on said seismic depth image;
      a stabilizing component for replacing a reflectivity term in said coupled RTDM equation with said pseudo-density function, creating a stabilized coupled RTDM equation;
      an engine component for solving said stabilized coupled RTDM equation and reconstructing wavefields associated with said seismic depth image; and
      an output component for outputting a modeled seismic image of said subsurface formation, wherein said output component simultaneously outputs surface related multiples, interbed multiples and source receiver ghosts as said modeled seismic image.

10. The node of claim 9, wherein said pseudo-density component further comprises a nonlinear solver component for estimating said pseudo-density function with a nonlinear inversion.

11. The node of claim 9, wherein said engine component further comprises a multiples component for generating said modeled seismic image as surface related multiples and interbed multiples.

12. The node of claim 9, wherein said engine component further comprises a ghosts component for generating said modeled seismic image as source-receiver ghosts.

13. The node of claim 10, wherein said nonlinear solver component further comprises a least-squares component for estimating said pseudo-density function.

14. The node of claim 13, wherein said least-squares component further comprises a steepest descent method for estimating said pseudo-density function.

15. The node of claim 10, wherein said pseudo-density component further comprises a predetermined penalization parameter for regularizing an optimization estimate associated with estimating said pseudo-density function.

16. The node of claim 12, wherein said ghosts component further comprises a free surface condition component for adding a predetermined free surface condition to said stabilized coupled RTDM equation.

17. The node of claim 16, wherein said predetermined free surface condition is setting a surface wavefield to zero.

* * * * *